D. KEIL.
CHAIN FASTENER.
APPLICATION FILED NOV. 9, 1917.
1,275,265.
Patented Aug. 13, 1918.
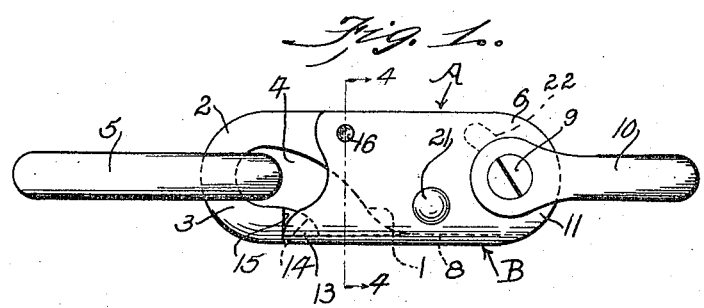
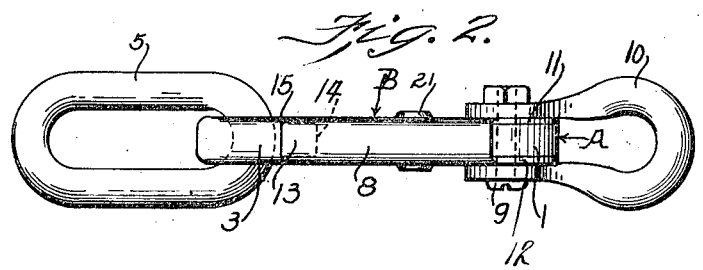
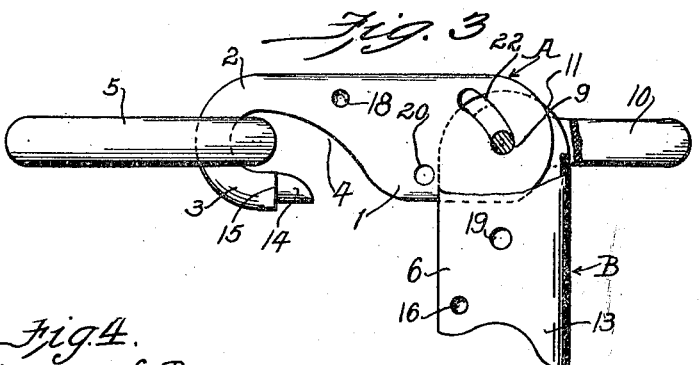
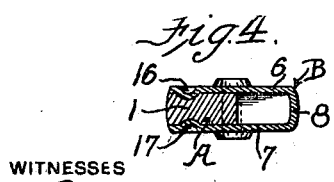
INVENTOR
Daniel Keil
By Richard Owen
ATTORNEY

UNITED STATES PATENT OFFICE.

DANIEL KEIL, OF SLEEPY EYE, MINNESOTA.

CHAIN-FASTENER.

1,275,265.   Specification of Letters Patent.   Patented Aug. 13, 1918.

Application filed November 9, 1917. Serial No. 201,115.

*To all whom it may concern:*

Be it known that I, DANIEL KEIL, a citizen of the United States, residing at Sleepy Eye, in the county of Brown and State of Minnesota, have invented certain new and useful Improvements in Chain-Fasteners, of which the following is a specification.

This invention relates to chain fasteners, and more particularly to a device for fastening an anti-skid chain about the tire and rim of an automobile wheel.

One of the main objects of the invention is to provide a device of the character stated of simple construction which may be produced at small cost and may be readily applied. A further object is to provide a device which, when in use, will form, in effect, a link of the chain being free of all projections such as would tend to interfere with operation of the chain in the usual manner. Another object is to provide a fastener comprising a hook and a clip carried thereby, the clip acting to effectually guard or close the bill of the hook so as to prevent accidental withdrawal of the chain therefrom. A further object is to provide releasable means for securing the clip in closed position, the clip being so constructed as to be held in closed position by the tension of the chain when the chain is in use. Further objects will appear from the detailed description.

In the drawings:

Figure 1 is a top plan view of a fastener constructed in accordance with my invention in closed condition.

Fig. 2 is a side view of the same.

Fig. 3 is a view similar to Fig. 1 showing the clip in completely open position and partly broken away.

Fig. 4 is a section taken approximately on line 4—4 of Fig. 1.

This fastener comprises, broadly stated, a hook A and a spring clip B mounted thereon for closing the bill of the hook. Hook A is provided with the enlarged body portion 1, restricted neck 2, and the inwardly directed arcuate bill 3 which serves to provide a passageway or slot 4 for the reception of the end link 5 of the chain. The clip B is formed by stamping and bending from sheet metal of suitable gage and temper, and is of approximately U-shape in cross section having the arms 6 and 7 and the base or connecting bar 8. This clip is pivotally secured adjacent its outer end by a tap screw 9 inserted through alined bores in the clip and the body 1 of the hook adjacent the outer end thereof, this screw also serving to pivotally secure a clevis 10 to the base portion of the fastener. As will be noted more clearly from Fig. 2 of the drawings, the base or front wall 8 of the clip terminates a considerable distance from the outer ends of the arms 6 and 7 thus providing, in effect, spaced ears 11 and 12 for securing the clip to the hook, this construction permitting movement of the clip about the base portion of the body 1. The clip is of such size and shape as to fit snugly about the front portion and the sides of the body of hook A, the arms 6 and 7, due to their resiliency, being pressed tightly against the side faces of body 1. The inner end portion of clip B is extended to form a closure member 13 which is adapted, when the clip is in closed position, to effectually close the passageway 4 so as to prevent withdrawal of link 5. The inner end portion of bill 3 of the hook is reduced to provide a member 14 having an annular shoulder 15 at its outer end or base. This shoulder corresponds in height to the thickness of the metal of which the clip is formed, approximately, so that when the clip is in closed position the inner end thereof will be closely adjacent this shoulder and the outer front surface of the clip will be flush with the outer surface of bill 3 of the hook. This serves to effect a tight closure between the clip and the bill of the hook so as to prevent the entry of snow, mud, and other foreign material into the clip at this point, such as would occur if the clip projected beyond the face of the hook. In addition, when the clip is in closed position, the fastener is of smooth contour being free of all points or projections such as would tend to catch on the automobile wheel so as to cause injury thereto or prevent proper operation of the chain.

Arm 6 of the clip B is provided with an inwardly directed projection or lug 16 formed integral therewith, this lug being in alinement with a similar lug 17 formed in arm 7. These two lugs may be readily formed by punching, though it will be evident that other means may be adapted to provide these fastening members. The lugs 16 and 17 are adapted to engage into suitable recesses 18 formed in the opposite faces of the body 1 of the hook when the clip is in closed position. Due to the resiliency of the arms of the clip, when the clip has been moved into its innermost position, as in Fig. 1 of the drawings, the lugs 16 and 17 will be snapped into the recesses 18, this serving to releasably but tightly secure the clip in closed position. The arms 6 and 7 are provided with alined apertures 19 which are in register with a bore 20 extending through body 1 of the hook. A pivot pin 21 is inserted through the apertures 19 and bore 20, this pin being positioned somewhat nearer the front edge of the body of the hook than the forward end of the arcuate slot 22 formed in the base end of the body. This slot is concentric with pin 21, and serves to permit inward movement of the outer portion of the clip when the inner portion is moved outward, the clip rocking about pin 21.

In using this device, one end link of the chain is secured in the clevis 10, after which the chain is passed about the rim and tire of the wheel the other end link 5 being inserted into the bill 3 of hook 9, after which the clip B is moved into closed position and secured in the manner previously described. The chain may be thus quickly and easily secured on the wheel and operates in the well known manner to provide traction gripping means, the fastener constituting in effect a link of the chain and serving to effectually prevent accidental displacement of the same. When the chain is tensioned, the screw 9 is pulled into the outer end of slot 22 so as to have its axis in front of the axis of link 5, the chain thus rocking the clip into closed position about pin 21 and maintaining it in this position. As will be clearly noted from Figs. 1 and 3 of the drawings, the arcuate slot 22 which is concentric with pivot pin 21 is of considerably less than 180° in length thus eliminating all possibility of the screw 9 being moved into position in advance of the pivot pin when the clip is open. This screw thus coacts with the slot 22 to insure that the clip B will never be open to such an extent as to permit the line of tension exerted by member 10 to pass outside of the pivot pin 21, while permitting sufficient opening of the clip to render ready insertion of link 5 possible. In this manner, when the chain is tensioned pin 9 will be moved in slot 22 so as to automatically close the clip in the event that it is unintentionally left in open position, the clip being secured in closed position by the locking members 16 and 17 and coacting recesses 18, the screw 9, when the chain is tensioned, acting as an additional means for securing the clip closed. Also, in the event that the clip should by any possibility be accidentally opened, it will be immediately returned to closed position and secured in this position, when the chain is tensioned.

As will be noted, the hook is of approximately elliptical outline, having its lateral faces flat or plane, and of substantially the same size as the link 5 of the chain. This fastener, constructed in this manner, while very efficient forms, in effect, a link of the chain and presents a very neat appearance without being unduly conspicuous.

What I claim is:

In chain fasteners, a hook comprising a body portion and an inwardly directed bill carried by said body at one end thereof, a clip pivotally secured intermediate its ends on the body of the hook for movement toward and away from the bill thereof, said clip being provided with an element for guarding the opening of the bill when in closed position so as to prevent withdrawal of a chain link inserted into the bill, the body portion of the hook being provided at the other side of the axis of the clip from the bill with an arcuate slot concentric with the axis of movement of said clip, and the clip being provided with alined openings registering with said slot, the slot and openings of the clip being adapted to receive a securing member inserted therethrough for connecting the end link of a chain to the body of the hook and the clip, the other end link of the chain being inserted into the bill of the hook, whereby when the chain is tensioned the clip will be rocked toward the bill of the hook into closed position and maintained in this position, said arcuate slot being of proper length to permit complete closing of the clip by tensioning of the chain.

In testimony whereof I affix my signature in presence of two witnesses.

DAN KEIL.

Witnesses:
WILLIAM BRUST.
RAYMOND O. BRUST.